May 24, 1949.   R. A. PIPER   2,470,836
LOAD DISCHARGING APPARATUS FOR FARM WAGONS
Filed July 16, 1946   3 Sheets-Sheet 1
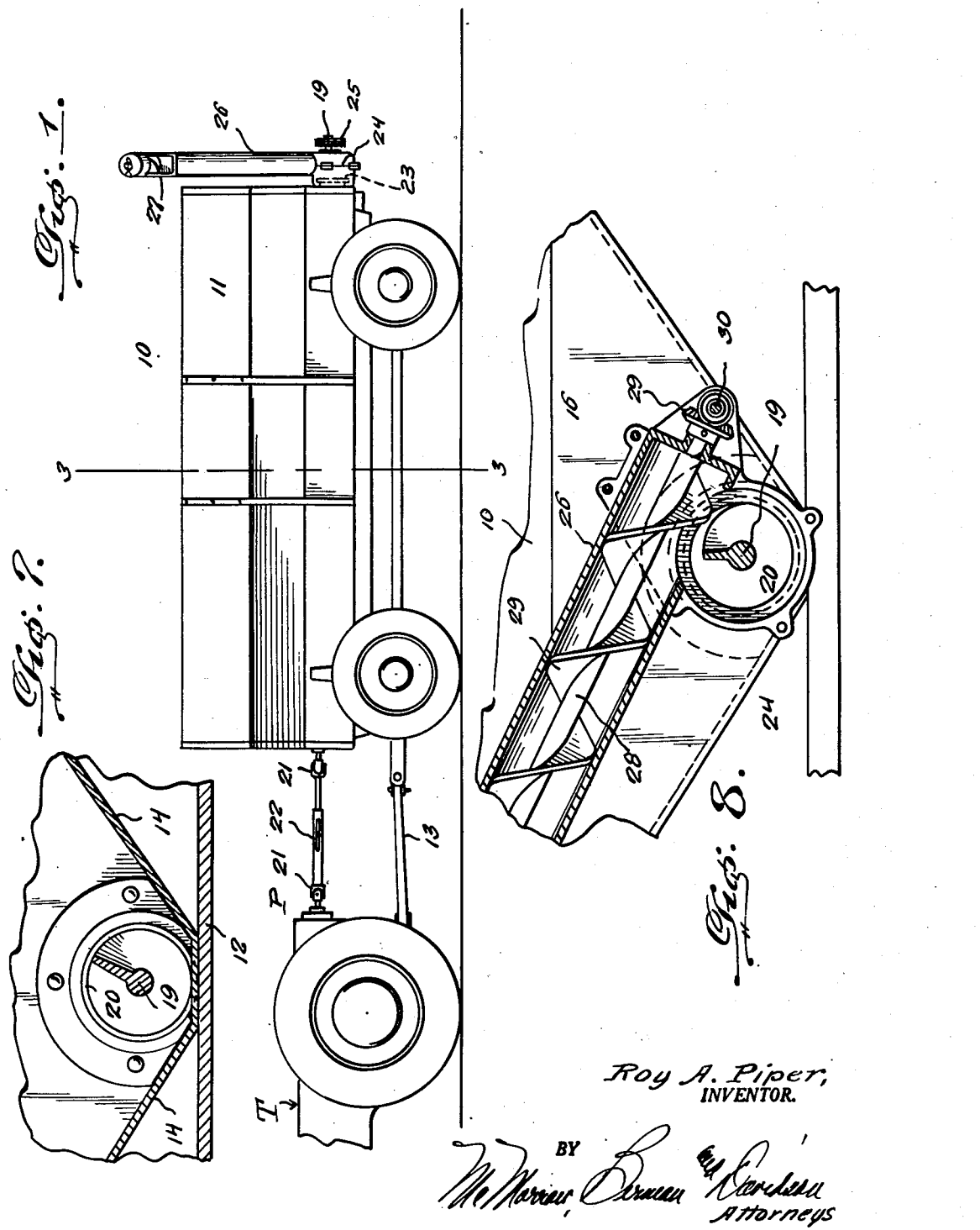
Roy A. Piper,
INVENTOR.

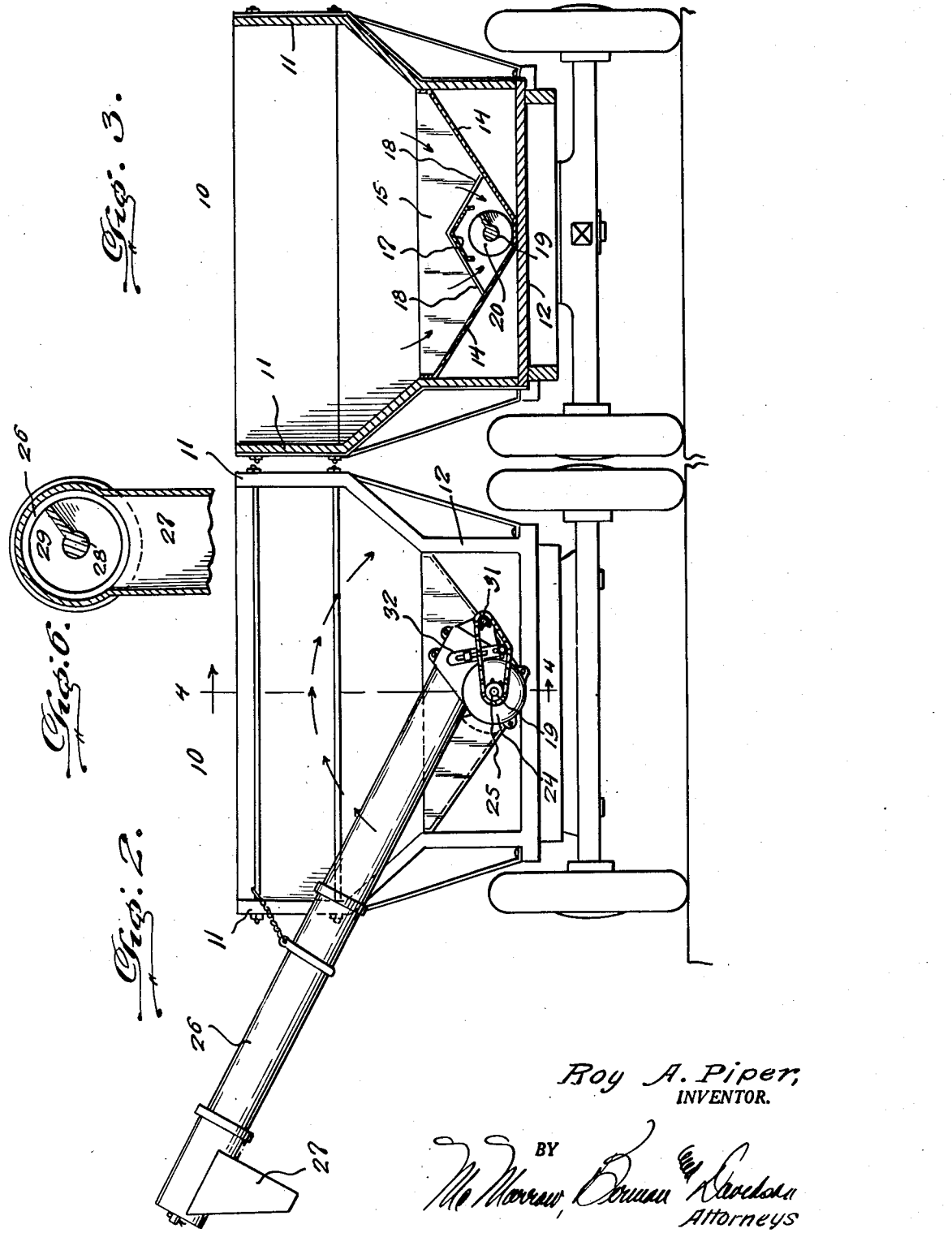

May 24, 1949.   R. A. PIPER   2,470,836
LOAD DISCHARGING APPARATUS FOR FARM WAGONS
Filed July 16, 1946   3 Sheets-Sheet 3
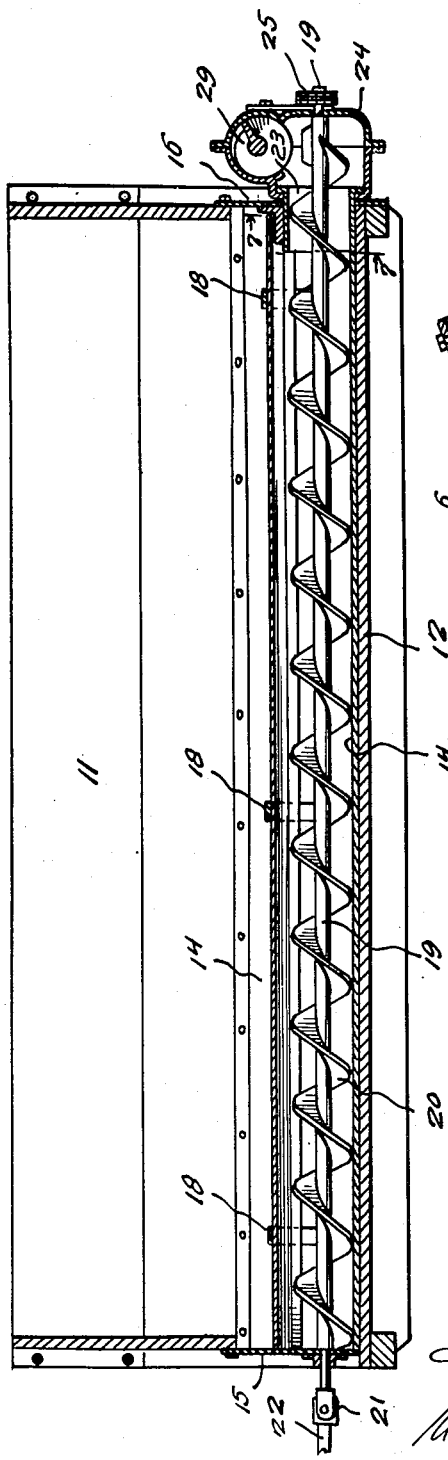
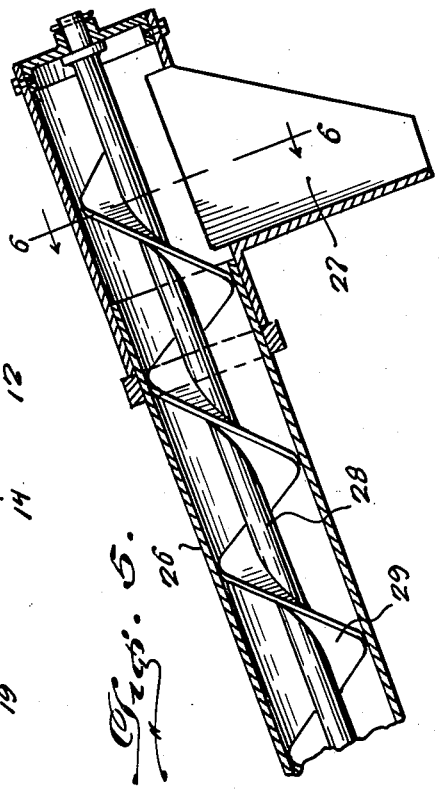
Roy A. Piper,
INVENTOR.
BY
Attorneys Patented May 24, 1949

2,470,836

UNITED STATES PATENT OFFICE 2,470,836

LOAD DISCHARGING APPARATUS FOR FARM WAGONS

Roy A. Piper, Princeton, Ill.

Application July 16, 1946, Serial No. 683,881

3 Claims. (Cl. 214—83.32)

The present invention relates to unloading apparatus for farm wagons and is more particularly concerned with a conveyor to be attached to an ordinary wagon of the type having flared sides.

The primary object of the invention is to provide a load discharging unit which can be readily installed in a wagon of the type referred to.

Another object of the invention is to provide a device of the character referred to which is designed to be operated by power take off from a tractor which also hooks on to the wagon and moves it from place to place.

A further object of the invention is to provide a device of the character referred to of simpler and more compact construction than prior devices.

With the foregoing and other objects and advantages in view the invention consists of the novel construction and arrangement of parts hereinafter described and claimed.

In the accompanying drawings illustrating the invention,

Figure 1 is a side elevation of a wagon with the novel apparatus installed and connected to a power take off on a tractor.

Figure 2 is a rear elevation of the wagon shown in Figure 1.

Figure 3 is a vertical transverse section on line 3—3 of Figure 1.

Figure 4 is a vertical longitudinal section on line 4—4 of Figure 2.

Figure 5 is an enlarged fragmentary longitudinal section of the elevator discharge tube and spout.

Figure 6 is an enlarged fragmentary section on line 6—6 of Figure 5.

Figure 7 is an enlarged fragmentary section on line 7—7 of Figure 4, and

Figure 8 is an enlarged fragmentary section of the lower end of the discharge tube and conveyor.

Like reference characters, as used in the description and drawings, designate the same parts of construction.

Referring to Figure 1 of the drawings, 10 is a farm wagon provided with flared sides 11 and a bottom 12 rectangular in cross-section. The tongue 13 of the wagon can be hooked on to the rear end of a tractor T. P refers to a power take off on the tractor which is employed to operate the hereinafter described apparatus for unloading the wagon.

This apparatus, in terms of its barest essentials, comprises a trough 14 substantially V-shape in cross-section, with front and end walls 15 and 16. The trough is designed to be seated on the wagon bottom longitudinally and said end walls to be bolted to the front and rear walls of the wagon.

Extending longitudinally therein is a baffle plate 17, substantially V-shape inverted, and it is suitably spaced above the bottom of the trough, as shown in Figure 3, to form a hollow body. Straps 18 to the sides of the trough support the baffle.

Extending through the trough between its bottom and the baffle is a rotatable conveyor consisting of a shaft 19 provided integrally with an auger type or spiraled conveyor 20. The forward end of the shaft extends through a suitable bearing in the front wall 15 of the trough and is coupled to the power takeoff P by two universals 21 and a telescopic rod 22 therebetween.

The rear end of the conveyor shaft extends through a flanged sleeve 23 mounted in the rear end of the trough and through the wall of a sectional housing 24 attached to the flange of said sleeve so as to be revolvable about the axis of the conveyor shaft 19. On the end which projects through the housing, is mounted a sprocket 25. The joint between housing and sleeve, by interlocking flanges, is designed to allow swivel motion to a laterally-extending conveyor tube 26 which is mounted on the housing and communicates therewith. The tube is secured in the housing by removable bolts 32 so that the tube can be taken off. As the tube 26 is adapted to be swung to the right or left in a vertical plane and the hood and spout 27 can be turned to front or rear thereof the truck can discharge its load in four different directions, as desired.

The upper end of the tube is provided with a rotatable hood having a discharge opening and a downwardly directed spout 27. The lower end of tube 26 is also closed and mounted in suitable bearings in both ends is the shaft 28 of an auger-type conveyor 29, similar to conveyor 20.

The lower end of shaft 28 extends through the end of the tube 26 and carries a bevel pinion 29 which meshes with a similar pinion mounted on a shaft 30 at a right angle to the axis of pinion 29. This shaft is supported rotatably in ears on the housing and carries exteriorly a sprocket 31 which is connected by a sprocket chain to the sprocket 25 and is rotated thereby in unison with the shaft 19 of the conveyor in the bed of trough 14. It will be understood that the elevator tube 26 can be made in various lengths to suit the needs of the work and these alternate tubes may be readily substituted.

In operation the commodity is loaded into the wagon for transportation. When it arrives at its destination and unloading is desired, the conveyors are operated by the power take off of the hauling tractor. The conveyor in the wagon will feed the grain or other commodity to the elevating conveyor at the rear and through the elevator tube to the point of discharge.

As different embodiments may be made of this inventive concept and modifications may be made in the embodiment hereinbefore shown and described, it will be understood that the matter herein is to be interpreted as illustrative merely, and not in a limiting sense.

What I claim is:

1. The combination with a farm wagon body including a fixed flat bottom, a trough extending longitudinally of said body and supported on said bottom, a baffle plate arranged in superimposed spaced relation with respect to said trough and resting upon the walls of the latter to thereby form a hollow body, a rotatable spiraled conveyor extending through said hollow body having one end projecting beyond the front end of said wagon body for attachment to the power take-off of a tractor, the other end of said conveyor projecting from the rear end of said wagon body and terminating at a point contiguous to said rear end, a housing surrounding the end of said conveyor projecting from the rear end of the wagon body and mounted for rotation about the axis of said conveyor, a laterally-extending tube communicating with said housing and secured to the latter, a second rotatable spiraled conveyor in said tube having one end overlapping said first-named conveyor, and means operatively connecting the overlapping end of the second spiraled conveyor to the adjacent end of the first-named conveyor.

2. The combination with a farm wagon body including a flat bottom, a V-shaped trough extending longitudinally of said body and supported on said bottom, a sleeve mounted in the rear end of said trough, a baffle plate of substantially inverted V-shape arranged in superimposed spaced relation with respect to said trough and resting upon the walls of the latter to thereby form a hollow body, a rotatable spiraled conveyor extending through said hollow body having one end projecting beyond the front end of said wagon body for attachment to the power take-off of a tractor, the other end of said conveyor projecting through said sleeve and terminating at a point contiguous to the rear end of said wagon body, a housing surrounding the end of said conveyor projecting from the rear end of the wagon body and mounted on said sleeve for rotation about the axis of said conveyor, a laterally-extending tube communicating with said housing and secured to the latter, a second rotatable spiraled conveyor in said tube having one end overlapping said first-named conveyor, and means operatively connecting the overlapping end of the second-named conveyor to the adjacent end of the first-named conveyor.

3. The combination with a farm wagon body including a fixed flat bottom, a trough extending longitudinally of said body and supported on said bottom, a fixed baffle plate arranged in superimposed spaced relation with respect to said trough and resting upon the walls of the latter to thereby form a hollow body, a rotatable spiraled conveyor extending through said hollow body and having an end projecting from the rear end of said wagon body and terminating at a point contiguous to said rear end, a housing surrounding the projecting end of said conveyor and mounted for rotation about the axis of said conveyor, a laterally-extending tube communicating with said housing and secured to the latter, a second rotatable spiraled conveyor in said tube having an end overlapping said first-named conveyor, and means operatively connecting the overlapping end of said second-named conveyor to the projecting end of said first-named conveyor.

ROY A. PIPER.

REFERENCES CITED

The following references are of record in the file of this patent:

UNITED STATES PATENTS

| Number | Name | Date |
|---|---|---|
| 669,876 | Critchlow | Mar. 12, 1901 |
| 2,110,262 | Curtis | Mar. 8, 1938 |
| 2,147,992 | Schau | Feb. 21, 1939 |
| 2,296,014 | Benzel, Sr., et al. | Sept. 15, 1942 |
| 2,412,121 | Bradshaw | Dec. 3, 1946 |
| 2,417,020 | Shugart | Mar. 4, 1947 |
| 2,431,000 | Step | Nov. 18, 1947 |
| 2,438,301 | Schulte | Mar. 23, 1948 |